Inventor
Paul R. Follis
By Clarence A. O'Brien
Attorney

Inventor
Paul R. Follis
By Clarence A. O'Brien
Attorney

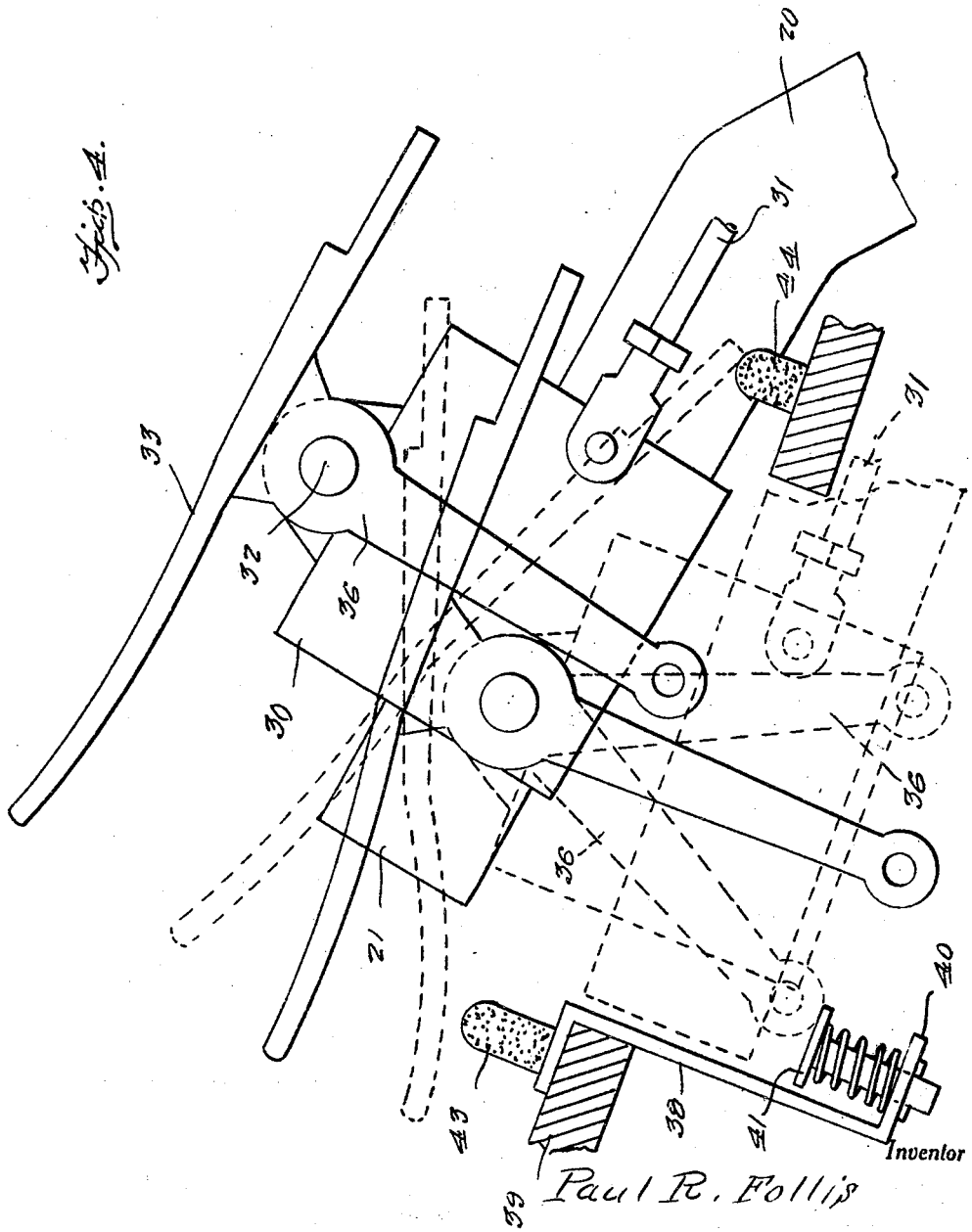

Patented Feb. 24, 1931

1,794,163

UNITED STATES PATENT OFFICE

PAUL R. FOLLIS, OF PADUCAH, KENTUCKY, ASSIGNOR TO FOLLIS CLUTCH PEDAL GEAR SHIFT COMPANY, OF PADUCAH, KENTUCKY, A CORPORATION OF KENTUCKY

TRANSMISSION-GEAR-SHIFTING MECHANISM

Application filed April 11, 1930. Serial No. 443,438.

This invention relates to new and useful improvements in transmissions and more particularly to a mechanism adapted to be operatively associated therewith for effecting the shifting of the gears of said transmission.

The primary object of the invention is to provide, in a manner as hereinafter set forth, a gear-shifting mechanism of the aforementioned character for transmission which is adapted to be operated entirely by the feet of a person to effect any and all of the desired shifts, thus leaving the hands free to steer the vehicle, it being understood, of course, that this device is particularly for use on automobiles.

Another important object of the invention is to provide a transmission gear shifting mechanism embodying means operatively connected to the clutch in such a manner that an initial or preliminary movement of the mechanism will disengage the clutch prior to the gear shifting operation.

Other objects of the invention are to provide a transmission gear shifting mechanism of the character described which is adapted for use on transmissions of the type in general use in automobiles, which will be simple in construction, strong, durable, efficient in its use, and which may be manufactured and installed at low cost.

All of the foregoing and still further objects and advantages of the invention may become apparent from a study of the following specification, taken in connection with the accompanying drawings, wherein like characters of reference designate corresponding parts throughout the several views, and wherein:

Figure 4 is an enlarged fragmentary view in side elevation showing the operating pedals and the supporting means therefor.

Figure 1:
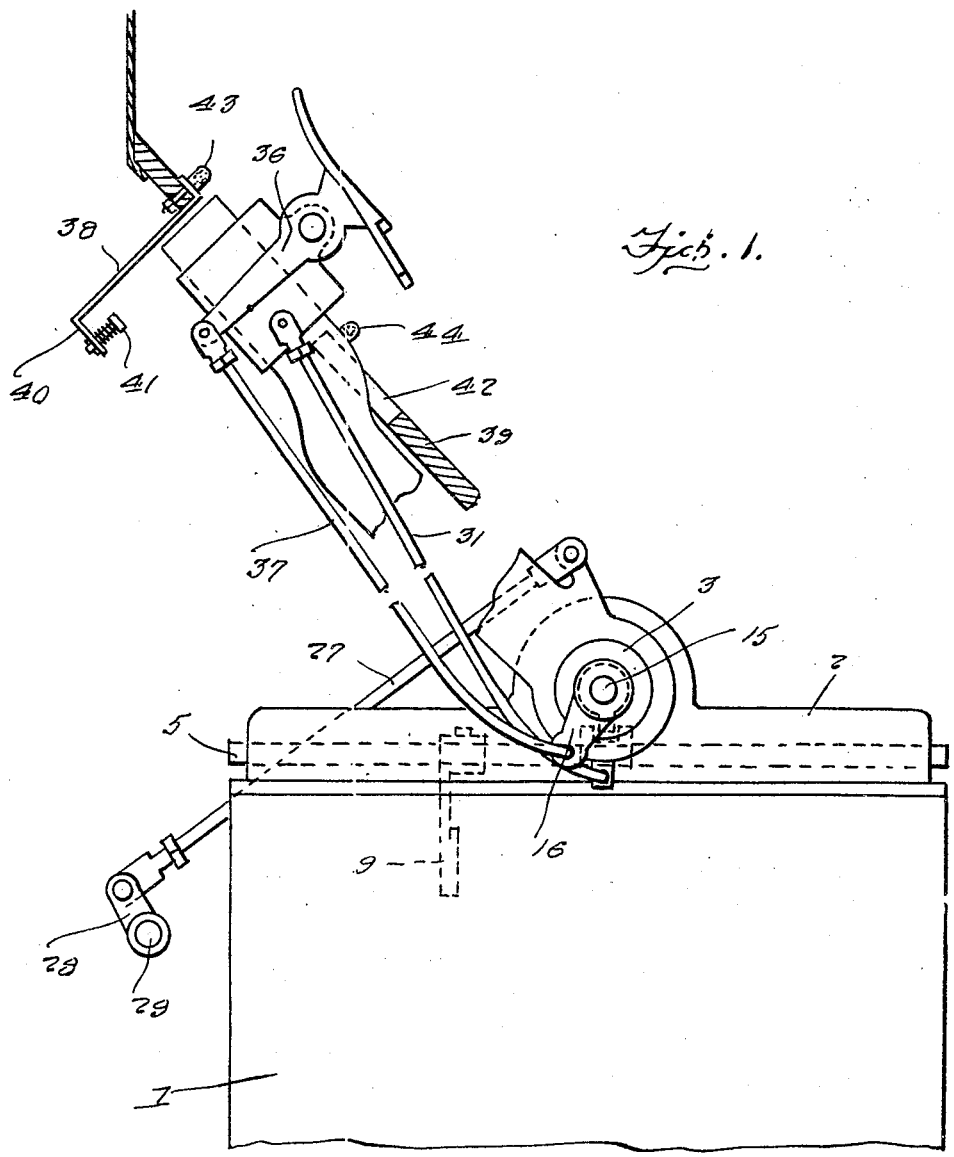
Figure 1 is a view in side elevation of a transmission gear shifting mechanism constructed in accordance with this invention mounted in operative position on a transmission of the sliding gear type.

Referring to the drawings in detail, it will be seen that the reference numeral 1 designates a transmission housing in which is operatively mounted the usual transmission gears, the open upper side of said housing being closed by the plate 2 having an integral tubular bearing 3 formed thereon and projecting outwardly beyond the one side thereof.

Figure 2:
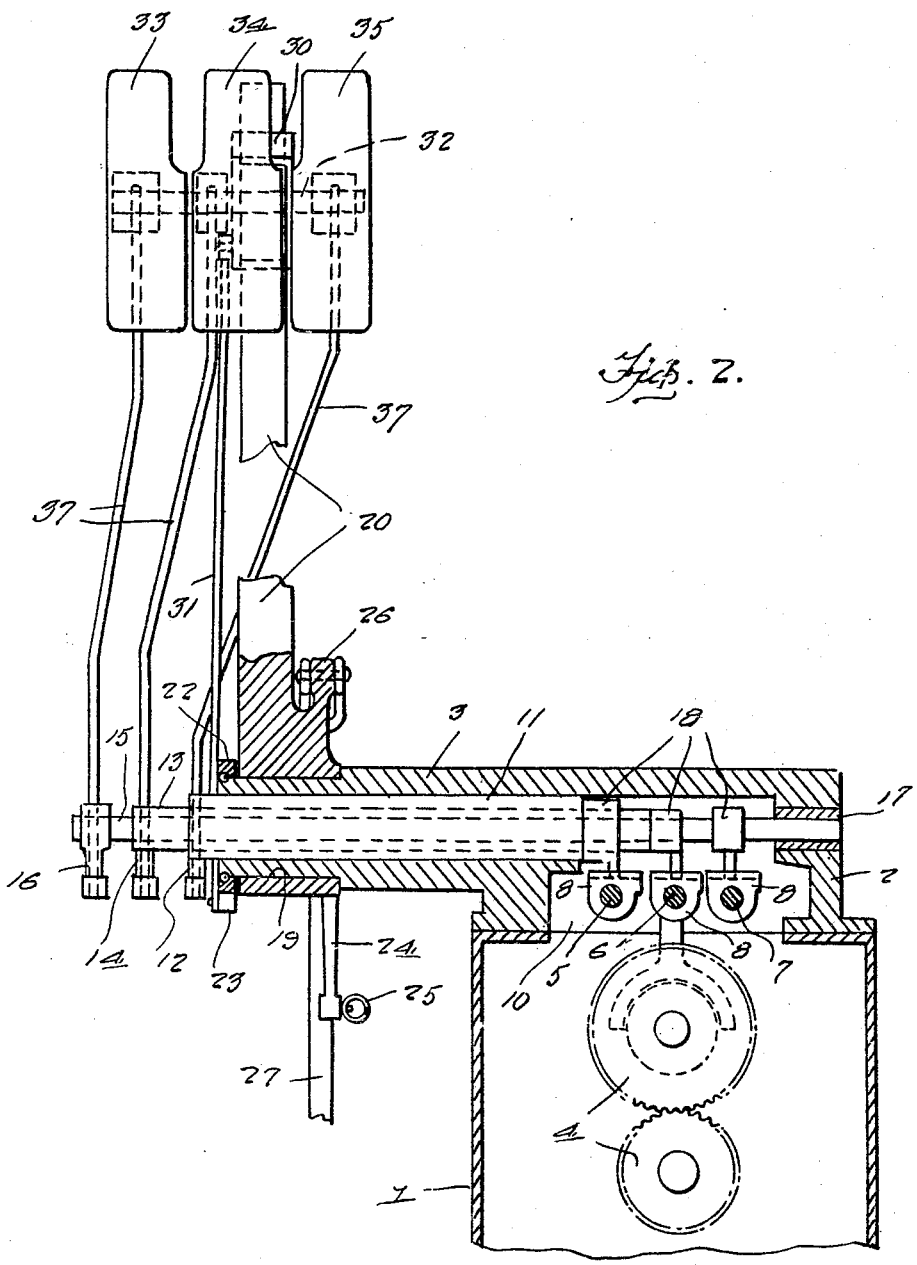
Figure 2 is a fragmentary cross sectional view.
Figure 3:
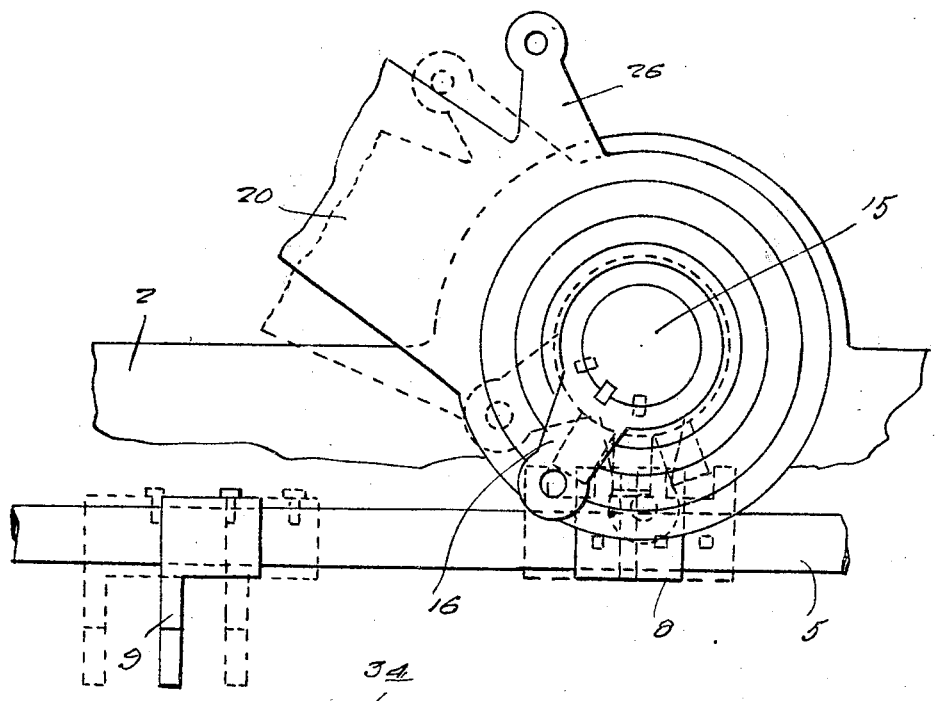
Figure 3 is an enlarged fragmentary view in side elevation.
Figure 5:
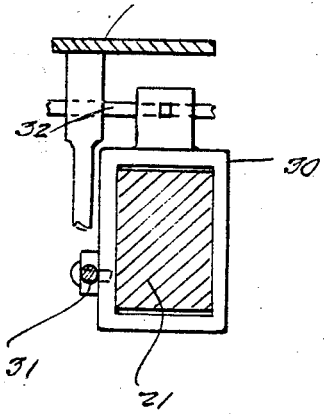
Figure 5 is a detail view in cross section showing the pedal supporting means.

The transmission gears are designated by the reference numeral 4, as seen in Figure 2 of the drawings.

Mounted for longitudinal sliding movement in the cover plate 2 is a series of spaced, parallel shift rods 5, 6 and 7 each of which has fixed thereon a block 8 having a flat horizontally disposed upper side through which extends transversely a groove or channel. Also fixed on each of the rods is a depending yoke 9 adapted for operative engagement in the usual manner with the slidable gears in the transmission for actuating same upon movement of said shift rods.

The cover plate 2 is formed to provide a chamber 10 which communicates with the bore of the tubular bearing 3 at its inner end and also with the interior of the housing 1. A tubular shaft 11 is disposed longitudinally for rotation through the bearing 3 and extends a slight distance therefrom into the chamber 10 at one end and projects outwardly from said bearing at its opposite end and has fixed thereon an arm 12.

A tubular shaft 13 is rotatably mounted in the tubular shaft 11 and projects beyond the opposite end thereof and has fixed on its outer end portion an arm 14. An elongated shaft 15 is rotatably disposed through the tubular shaft 13 and projects beyond the opposite ends thereof and has fixed on its outer end an arm 16.

The shaft 15 extends transversely across the chamber 10 and has one end journalled for rotation in the bearing 17 provided therefor in the cover plate 2, said bearing 17 being alined with the tubular bearing 3. Each of the shafts 11, 13 and 15, have fixed thereon, within the chamber 10, a depending dog 18 which has its free end disposed in the transverse grooves or channels in the blocks 8.

In this manner, the shafts 11, 13 and 15 are operatively connected to the rods 5, 6 and 7, the shaft 11 being adapted to move the rod 5, the shaft 13 being adapted to move the rod 6 and the shaft 15 being adapted to move the rod 7.

The free end portion of the tubular bearing 3 is reduced to provide a bearing 19 upon which is rotatably mounted for swinging movement a forwardly and upwardly disposed arm 20 having a longitudinally offset free end portion 21 of polygonal cross-section. A flange 22 is removably keyed on the outer end portion of the bearing 19 to retain the arm 20 in position thereon and said flange is provided with an integral apertured lug 23 on its periphery.

An arm 24 depends from the lower end of the arm 20 and has connected thereto a spring 25 which has its opposite end connected to a suitable support, said spring constituting means for yieldingly maintaining the arm 20 in raised inoperative position. The arm 20 is further provided, adjacent its lower end, with an integral apertured arm 26 which is disposed parallel with said arm 20 and a connecting rod 27 (see Figure 1) operatively connects the arm 26 with an arm 28 fixed on the clutch operating shaft 29.

The bracket 30 is mounted for longitudinal sliding movement on the polygonal end portion 21 of the main arm 20 and said bracket is connected to the apertured lug 23 of the retaining flange 22 through the medium of the spacing rod 31. A horizontally disposed transversely extending shaft 32 is mounted on the bracket 30 and mounted for rocking movement on the shaft 32 are the pedals 33, 34 and 35.

The pedals 33, 34 and 35 are mounted on the shaft 32 through the medium of the levers 36 through an intermediate portion of which said shaft 32 extends. As clearly seen in Figure 1, the pedals are disposed on the upper ends of the levers 36 and said levers are operatively connected, at their lower ends, to the arms 12, 14 and 16 through the medium of the rods 37.

A bracket 38 depends from the floor board 39 and is provided with a right angularly disposed free end portion 40 through which slidably extends the spring controlled stop member 41 which is engaged by the main arm 20 and constitutes a stop for limiting the downward swinging movement of said arm 20.

The floorboard 39 is provided with an opening 42 to accommodate the main arm 20, as clearly illustrated in Figures 1 and 4 of the drawings. A rubber bumper block 43 is mounted adjacent the upper end of the opening 42 to engage with the toe portion of the pedal 33 to return said pedal 33 to inoperative or neutral position when the main arm 20 is swung to its lowermost position.

A rubber bumper block 44 is also disposed on the floorboards 39 for engagement with the heel portion of the pedal 34 to shift same to neutral or inoperative position when the main arm 20 is in its lowermost position.

In operation, the operator preferably places his left foot on the pedal 33 and swings the main arm 20 downwardly to disengage the clutch of the vehicle through the medium of the connecting rod 27.

After the clutch is disengaged, any one of the pedals may then be rocked on the shaft 32 to actuate the shafts 11, 13 and 15 for the purpose of shifting the rods 5, 6 and 7, as will be obvious. In this manner, any desired shift of the gears in the transmission may be accomplished.

After the gears have been shifted in the desired manner, the main arm 20 is allowed to swing to its raised position and the clutch of the vehicle is again engaged.

It is believed that the many advantages of a transmission gear shifting mechanism constructed in accordance with this invention will be readily understood, and although the preferred embodiment of the invention is as illustrated and described, it is to be understood that changes in the details of construction may be had which will fall within the scope of the invention as claimed.

What is claimed is:

1. In a gear shifting mechanism for transmissions of the type having a plurality of slidable shift rods, an arm pivotally mounted for swinging movement, a series of foot pedals mounted for independent rocking movement on the free end portion of the arm, means for operatively connecting one of said foot pedals with each of the shift rods and means operatively connecting the arm with a clutch which is associated with the transmission in a manner to disengage said clutch upon swinging movement of the arm.

2. In a gear shifting mechanism for transmissions of the type having a plurality of slidable shift rods, a plurality of independently rotatable rock shafts operatively connected with the shift rods, an arm pivotally mounted for swinging movement, a series of independently movable pedals mounted on the free end portions of the arm, means for operatively connecting the pedals with the shafts in a manner to actuate said shafts upon movement of the pedals and means for operatively connecting the arm with a clutch which is associated with the transmission in a manner to disengage said clutch upon swinging movement of the arm in one direction.

3. In a gear shifting mechanism for transmissions of the type having a plurality of slidable shift rods, a rock-shaft operatively connected with each of the shift rods, an arm pivotally mounted for swinging movement on the transmission, a bracket slidably mounted on the free end portion of the arm, a shaft mounted on the bracket, a series of foot pedals mounted for independent rocking movement on the shaft, means for operatively connecting the foot pedals with the rocker shafts and means for operatively connecting the arm to a clutch which is associated with the transmission in a manner to disengage said clutch upon swinging movement of the arm in one direction.

4. In a gear shifting mechanism for transmissions of the type having a plurality of slidable shift rods, rocker shafts mounted on the transmission and operatively engaged with each of the shift rods, an arm pivotally mounted for swinging movement on the transmission, a bracket slidably mounted on the free end portion of the arm, means for moving the bracket longitudinally on the arm upon swinging movement of said arm, a shaft mounted transversely on the bracket, a series of foot pedals mounted for independent rocking movement on the last named shaft, rods operatively connecting the foot pedals to the rocker shafts, and a rod operatively connecting the arm to a clutch which is associated with the transmission in a manner to disengage said clutch upon swinging movement of the arm in one direction.

5. In a gear shifting mechanism for transmissions of the type having a plurality of slidable shift rods, an arm mounted for swinging movement on the transmission, foot pedals slidably and rockably mounted upon the arm, a clutch, and means operatively connecting the arm with the clutch and additional means uniting the pedals with the shift rods.

6. In a gear shifting mechanism for transmissions of the type having a plurality of slidable shift rods, an arm mounted for swinging movement relative to the transmission, a bracket slidable on the arm, foot pedals rockably mounted on the bracket, and means operatively connecting the foot pedals with the shift rods, a clutch, and means operatively connecting the arm with the clutch.

7. In a gear shifting mechanism for transmissions of the type having a plurality of slidable shift rods, an arm mounted for swinging movement relative to the transmission, a bracket slidable on the arm, a shaft carried by the bracket, foot pedals rockably mounted on the shaft, a clutch, and means operatively connecting the arm with the clutch and additional means uniting the pedals with the shift rods.

8. In a gear shifting mechanism for transmissions of the type having a plurality of slidable shift rods, an arm mounted for swinging movement relative to the transmission, foot pedals slidably and rockably mounted upon the arm, a clutch, a plurality of shafts engaging the shift rods, separate means uniting each of the shafts to a pedal, and means operatively connecting the arm with the clutch.

9. In a gear shifting mechanism for transmissions of the type having a plurality of slidable shift rods, an arm mounted for swinging movement on the transmission, foot pedals slidably and rockably mounted on the arm, a clutch, means operatively connecting the arm with the clutch, means uniting the pedals with the shift rods and additional means mounted adjacent the pedals for automatically rocking them to neutral or inoperative position upon the movement of the arm to its lowermost position.

10. In a gear shifting mechanism for transmissions of the type having a plurality of slidable shift rods, an arm mounted for swinging movement on the transmission, foot pedals slidably and rockably mounted on the arm, a clutch, means operatively connecting the arm with the clutch, means uniting the pedals with the shift rods and further means for limiting the swinging movement of the arm and comprising a spring stop adapted to be contacted by the arm.

In testimony whereof I affix my signature.

PAUL R. FOLLIS.